May 17, 1960  D. M. ADAMS ET AL  2,936,843
AUTOMOBILE DOOR LATCHING SYSTEM
Filed March 25, 1957  6 Sheets-Sheet 1

INVENTORS.
Louis P. Garvey,
Daniel M. Adams, &
BY Charles J. Griswold, Jr.
W. S. Pettigrew
ATTORNEY May 17, 1960  D. M. ADAMS ET AL  2,936,843
AUTOMOBILE DOOR LATCHING SYSTEM
Filed March 25, 1957  6 Sheets-Sheet 2

INVENTORS.
Louis P. Garvey,
Daniel M. Adams, &
BY Charles J. Griswold, Jr.
W. Pettigrew
ATTORNEY May 17, 1960  D. M. ADAMS ET AL  2,936,843
AUTOMOBILE DOOR LATCHING SYSTEM
Filed March 25, 1957  6 Sheets-Sheet 3

Fig. 5

INVENTORS.
Louis P. Garvey,
Daniel M. Adams, &
BY Charles J. Griswold,
W. S. Pettigrew Jr.
ATTORNEY May 17, 1960  D. M. ADAMS ET AL  2,936,843
AUTOMOBILE DOOR LATCHING SYSTEM
Filed March 25, 1957  6 Sheets-Sheet 6

INVENTORS.
Louis P. Garvey,
Daniel M. Adams, E.
BY Charles J. Griswold, Jr.
W. S. Pettigrew
ATTORNEY

United States Patent Office 2,936,843
Patented May 17, 1960

2,936,843
AUTOMOBILE DOOR LATCHING SYSTEM

Daniel M. Adams and Louis P. Garvey, Birmingham, and Charles J. Griswold, Jr., Oak Park, Mich., assignors to General Motors Corporation, Detroit, Mich., a corporation of Delaware Application March 25, 1957, Serial No. 648,209

8 Claims. (Cl. 180—82)

This invention relates to an automobile door latching system, and more particularly to a coincidental locking arrangement having novel safety controls.

One feature of the invention is that it provides an improved automobile door latching system; another feature of the invention is that it provides a coincidental automobile door locking arrangement having novel safety controls; still another feature of the invention is that means are provided for locking the rear doors of the automobile whenever the ignition switch is on and whenever the transmission selector is in any drive position; still a further feature of the invention is that novel means are provided for blocking the transmission selector out of any drive position whenever a selected door of the automobile is open; still another feature of the invention is that all of the doors of the automobile may be locked coincidentally by a switch inside the automobile body, and the rear door handles may be independently disconnected from the respective rear door latches whenever the transmission selector is in a drive position without regard to the locked or unlocked condition of the front doors.

Other features and advantages of the invention will be apparent from the following description and from the drawings in which.

This latching system is particularly designed for use in an automobile having front and rear doors wherein the front doors are hinged at their front edges and the rear doors are hinged at their rear edges. With this construction an unconventional center pillar arrangement may be used wherein the center pillar does not project out between adjacent edges of the front and rear doors and is not truly a structural part of the body of the automobile, but merely comprises a holding bracket for the front and rear door latch strikers.

One disadvantage in this type of automobile body construction is that, since the rear door is hinged along its rear edge and latches to the pillar at its front edge, this door, if inadvertently opened while the car is in motion, will swing into the wind. In order to guard against such a contingency, means are provided for disconnecting the latch of each rear door from its inside remote rear door operating handle whenever the ignition switch is on and the transmission selector is in any drive position, so that neither rear door can be opened while the car is being driven. In this latching system, means also are provided to block the transmission selector from being shifted from neutral to any drive position so long as either rear door is open. By virtue of this double safety arrangement, it is necessary to put the transmission selector in neutral or to turn off the ignition switch in order to reconnect each rear door latch to its operating handle so that the door can be opened from inside the vehicle. Once the door is open, the transmission selector is blocked in neutral so that the car cannot be driven away while a passenger is entering or leaving the rear passenger compartment.

The latching system of this invention, in addition to conventional inside garnish molding and outside key operated locking means, includes an electrical coincidental locking system by means of which all four doors may simultaneously be locked by finger switches located in the passenger compartment. Once locked, any of the doors may be unlocked in conventional manner by means of the garnish molding button from the inside or the front doors may be unlocked by means of a key from the outside. As switch on the door operated by the striker controls the transmission blocking arrangement.

Figures 1, 2:
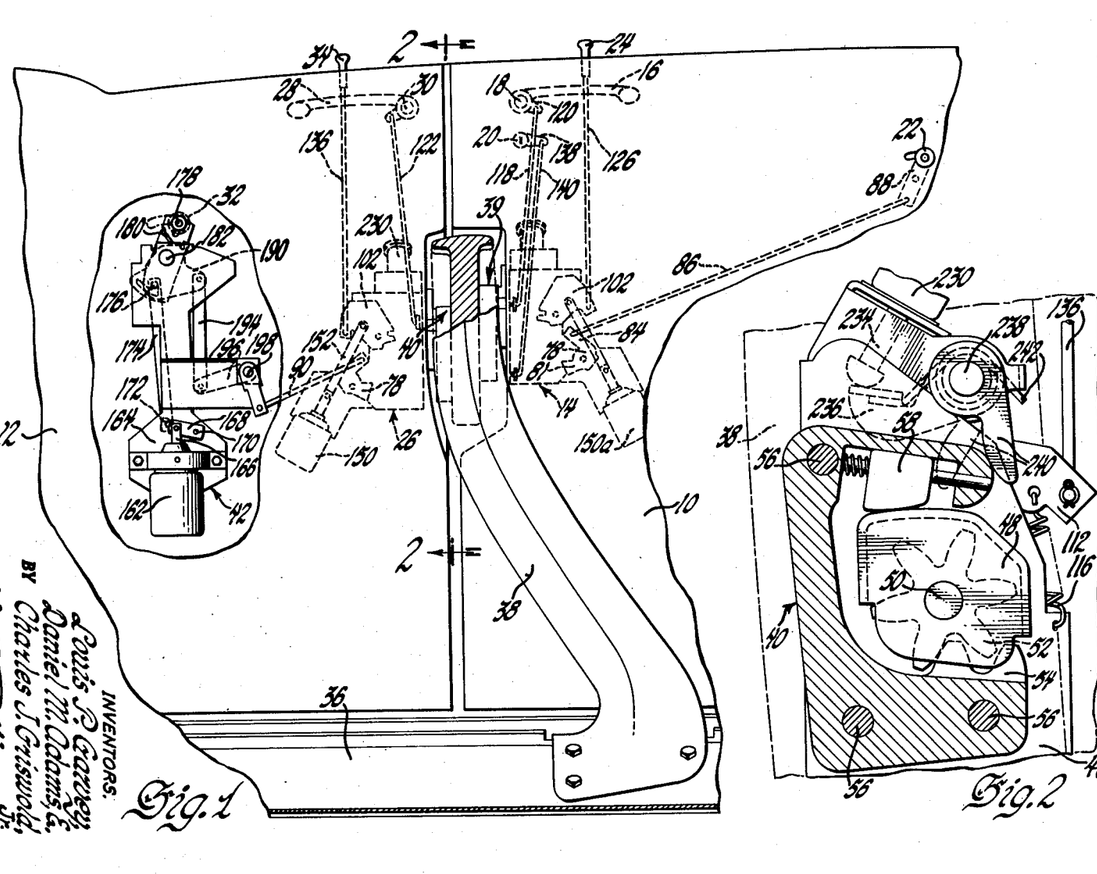
Figure 1 is a fragmentary side elevation of an automobile showing portions of the front and rear doors as viewed from inside the automobile body, the view being partly in section and portions lying behind the door panels being shown in broken lines.
Figure 2 is a fragmentary vertical section taken along the line 2—2 of Figure 1 showing the latch bolt and striker for one of the rear doors, parts being shown in solid lines in one position and in broken lines in another position.

Referring now more particularly to the drawings, Figure 1 shows a portion of an automobile having a front door 10 and a rear door 12. The front door is hinged at its front edge on the automobile body in conventional manner (not shown) and adjacent its rear edge the front door mounts a latch 14 which is carried between the inner and outer panels of the door. On the outer door panel there is a fixedly mounted gripping handle 16 slidably carrying a push button 18 for releasing the latch from outside the vehicle. Below the push button there is a conventional key cylinder 20 for locking and unlocking the door with a key. On the inner door panel there is a remotely located slide handle 22 for opening the door from inside. The door may be locked and unlocked from inside by means of a conventional garnish molding button 24.

The rear door 12 is hingedly mounted at its rear edge to the automobile body in conventional manner (not shown) and adjacent its front edge the rear door carries a latch designated generally as 26 mounted between the inner and outer panels of the door. Fixedly mounted on the outer panel is a gripping handle 28 slidably carrying a push button 30 for release of the latch from outside the car. On the inner door panel there is a slide handle 32 for operating the latch from inside the body and a conventional garnish molding button 34 is connected to the latch for locking and unlocking the door from inside the automobile. In the rear door there is no outside key lock.

Bolted to the sill portion 36 of the automobile body is a stubby center pillar 38. This pillar, which is fully disclosed in the copending application of James H. Wernig, filed October 24, 1956, as Serial No. 618,018, now Patent No. 2,895,763, and entitled Vehicle Body Structure, is not a structural part of the body as in more conventional automobile construction, but instead comprises merely a holding bracket for mounting a front door striker designated generally as 39 and a rear door striker designated generally as 40. Since the rear door is hinged at its rear edge, it would swing into the wind if inadvertently opened while the car is being driven. In order to prevent this, a free wheeling arrangement designated generally as 42 is provided to disconnect the latch 26 from the inside handle 32 whenever the ignition switch is on and the transmission selector is in drive position. This free wheeling means is described fully below.

Figure 5:
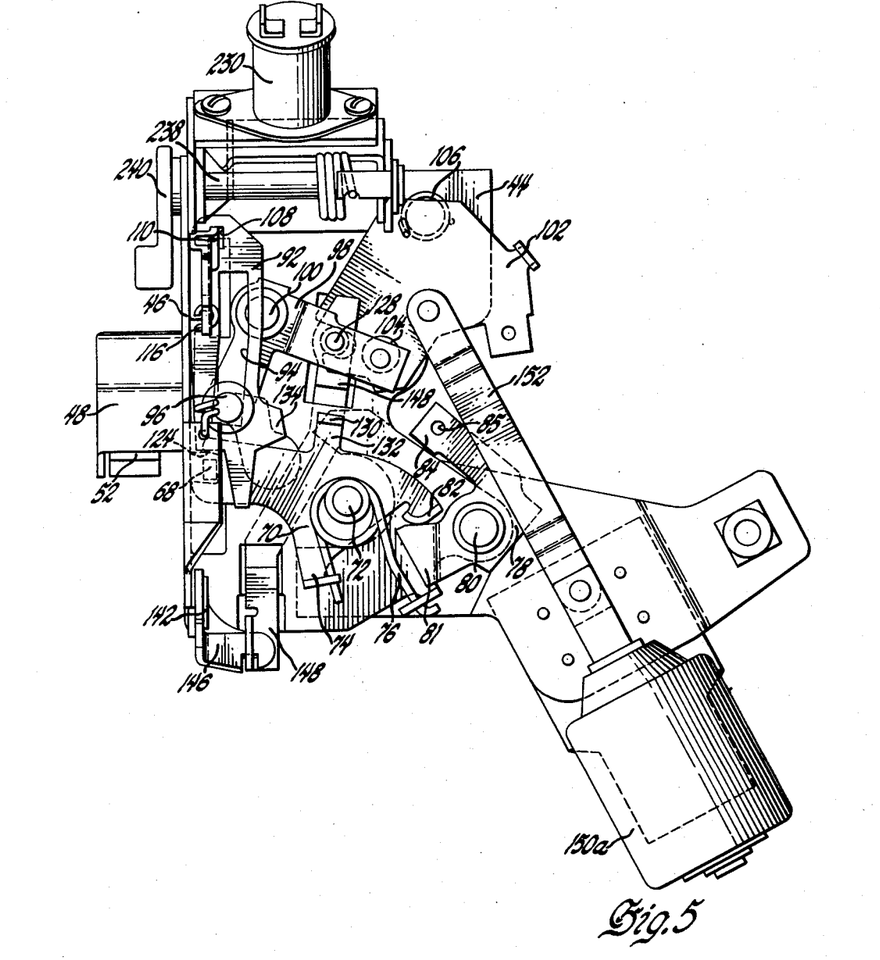
Figure 5 is an elevational view of one of the door latches removed from the automobile.
Figure 6:
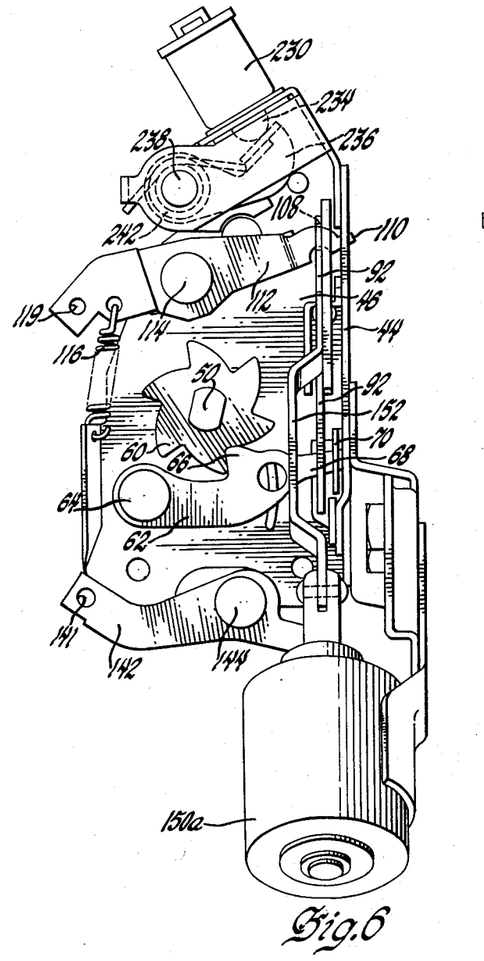
Figure 6 is a view of the latch of Figure 5 looking from the right thereof.

Figures 2, 5 and 6 show the construction of one of the door latches. Since all of the latches are alike, except for key locking the front door latch, the details of only one are shown. The latch has a frame including a base portion 44 which lies along the outer panel of the door and a right angular flange portion 46 which lies along the jamb edge of the door. A bolt housing 48 projects from the flange 46 through an opening in the jamb edge of the door, and a stud 50 is rotatably mounted between the flange 46 and the outer face of the bolt housing. A gear type bolt 52 is nonrotatably mounted on the stud 50 within the housing 48 for engagement with upstanding teeth 54 of the striker 40 which is mounted on the center pillar 38. As shown in Figure 2, the striker has a body which is generally C-shaped and which is secured to the pillar by bolts 56. The striker teeth 54 project upwardly from the upper surface of the lower arm of the C-shaped body for engagement with the bolt teeth, and the upper side of the bolt housing 48 wedges against a slidably mounted spring pressed shoe 58 carried on the upper arm of the C-shaped striker body.

At the opposite or inner side of the flange 46 of the latch frame a ratchet 60 is nonrotatably mounted on the stud 50 so that the stud, bolt and ratchet rotate as a unit. In practice the bolt and stud may be cast integrally and the ratchet may be peened on the end of the stud. As shown in Figure 6, the ratchet 60 is held against rotation in one direction (counterclockwise in Fig. 6) by a detent 62 pivotally mounted on the latch frame at 64 and having a foot 66 for engagement with a selected one of the ratchet teeth. At its free end the detent has a projecting portion 68 received in the bifurcated end of one arm of multi-armed lever 70. The lever 70, which is pivoted on the latch frame at 72, has a downwardly extending arm 74 engaged by a spring 76 which biases the lever 70 in a clockwise direction, thereby urging the free end of the detent upwardly so that the foot 66 of the detent is yieldably held in the latched position shown in Figure 6.

In order to open the door from the inside, there is a bell crank 78 pivotally mounted on the latch frame on a stud 80 and having one arm 81 underlying a tab 82 turned from another arm of the lever 70. The other arm 84 of the bell crank 78 extends upwardly from the pivot point and is adapted to be connected by an opening 85 to the inside remote handle.

Referring again to Figures 1 and 5, in the front door the arm 84 of the bell crank 78 is connected by a rod 86 to a lever 88 pivoted on the door and operated by the inside remote handle 22. When the remote handle is operated, the lever 88 swings in a counterclockwise direction to pull on the rod 86 and pivot the bell crank 78 in a clockwise direction, lifting up on its arm 81 and swinging the lever 70 counterclockwise to move the detent out of engagement with the teeth of the ratchet 60.

Again referring to Figure 1, in the rear door the bell crank 78 is connected by a rod 90 to the free wheeling mechanism 42 which is located between the latch and the inside remote handle 32. The construction and operation of this free wheeling mechanism will be described in detail below.

Figures 1, 5 and 6 show the means for operating the latch from outside the automobile and for locking the door. An intermittent link 92 has an elongated slot 94 formed therein and a headed stud 96 projects through this slot from a bell crank 98 which is pivoted on the latch frame at 100. The other arm of the bell crank 98 is articulated to a locking lever 102 which is pivoted at 104 on the latch frame and which is yieldably held in latched or unlatched position by an overcenter spring 106. At its upper end the intermittent link 92 has an opening 108 through which projects the free end 110 of an operating lever 112 pivoted on the flange of the latch frame at 114 and biased in a counterclockwise direction as the parts appear in Figure 6 by a tension spring 116 connected between lever 112 and the latch frame.

Referring to Figures 1 and 6, in the front door a rod 118 is connected in an opening 119 adjacent the end of the lever 112 and extends upwardly to make connection with a lever 120 which in turn is connected to and operated by the push button 18 in conventional manner. Similarly, in the rear door, a rod 122 connects the operating lever of the latch to the push button 30. When the push button in either door is operated, the associated connecting rod is pulled up, pivoting the lever 112 in a clockwise direction as the parts appear in Figure 6 and causing the intermittent link 92 to shift downwardly so that a shoulder 124 on this link picks up the detent extension 68 and swings the detent out of engagement with the ratchet 60 to permit free rotation of the bolt 52.

Figures 1 and 6 show how each door may be locked manually. In the front door the garnish molding button 24 is connected by a rod 126 to the lock lever 102. When the garnish molding button 24 is depressed, the rod 126 shifts downwardly to swing the lock lever 102 in a clockwise direction. Since the lever 102 is articulated at 128 to the bell crank 98, this bell crank is swung in a counterclockwise direction, causing the intermittent link 92 to swing counterclockwise about the end portion 110 of the operating lever 112. Now, if the outside push button is operated to move the intermittent link 92 down, the shoulder 124 of the link bypasses the detent portion 68 and the parts merely "free wheel" without releasing the bolt. Despite the fact that the door is now locked from the outside, it may be opened by the inside remote handle 22. When this handle is operated, the lever 70 swings in a counterclockwise direction and a turned tab 130 on an upstanding arm 132 of this lever engages a lug portion 134 of the intermittent link to swing the intermittent link back to its unlocked position wherein the detent portion 68 lies in the path of shifting movement of the shoulder 124 of the intermittent link. Simultaneously, the bifurcated end of the multiplier lever 70 engages the projecting portion 68 of the detent lever 62 and forces the foot 66 out of engagement with the ratchet teeth 60 to permit free rotation of the bolt 52.

As shown in Figure 1, inside locking of the rear door is similar, the locking lever 102 being connected to the garnish molding button 34 by a rod 136.

In the front door there is a conventional key cylinder device 20 which, upon operation by a key, swings a lever 138. This lever is connected by a rod 140 to a hole 141 in a rock lever 142 which is pivoted on the latch frame at 144 as shown in Figure 6. At its inner end the rock lever has a turned flange 146 (Figure 5) which is hooked in a slot formed in a connecting link 148. The upper end of the link 148 is pivoted to the locking lever 102 and to the bell crank 98 at the pivotal mounting pivot 128. When the key is turned, the rod 140 is shifted downwardly, swinging the rock lever 142 in a counterclockwise direction as the parts appear in Figure 6 so that the link 148 (Figure 5) shifts upwardly to swing the lock lever 102 to its locked position.

So far as above described, the door latches are of known type and are particularly disclosed in the copending application of James D. Leslie entitled "Rotary Bolt Door Latch," filed September 13, 1955, as Serial No. 534,034, which issued March 10, 1959, as Patent No. 2,877,043. In addition to the conventional type of manual operation above described, an electrical coincidental lock arrangement is provided wherein all four doors may simultaneously be locked by operation of switches which preferably are located within reach of the driver and the front seat passenger.

Referring again to Figures 1, 5 and 6, each door latch carries a solenoid, the rear door latch solenoids being identified as 150 and the front door latch solenoids being identified as 150a, each solenoid being mounted on an extension affixed to the latch frame. In each latch the solenoid plunger is connected to the locking lever 102 by means of a link 152 so that when the solenoid is energized, link 152 is pulled downwardly to swing the lock lever in each latch to its locked position.

Figures 10, 11:
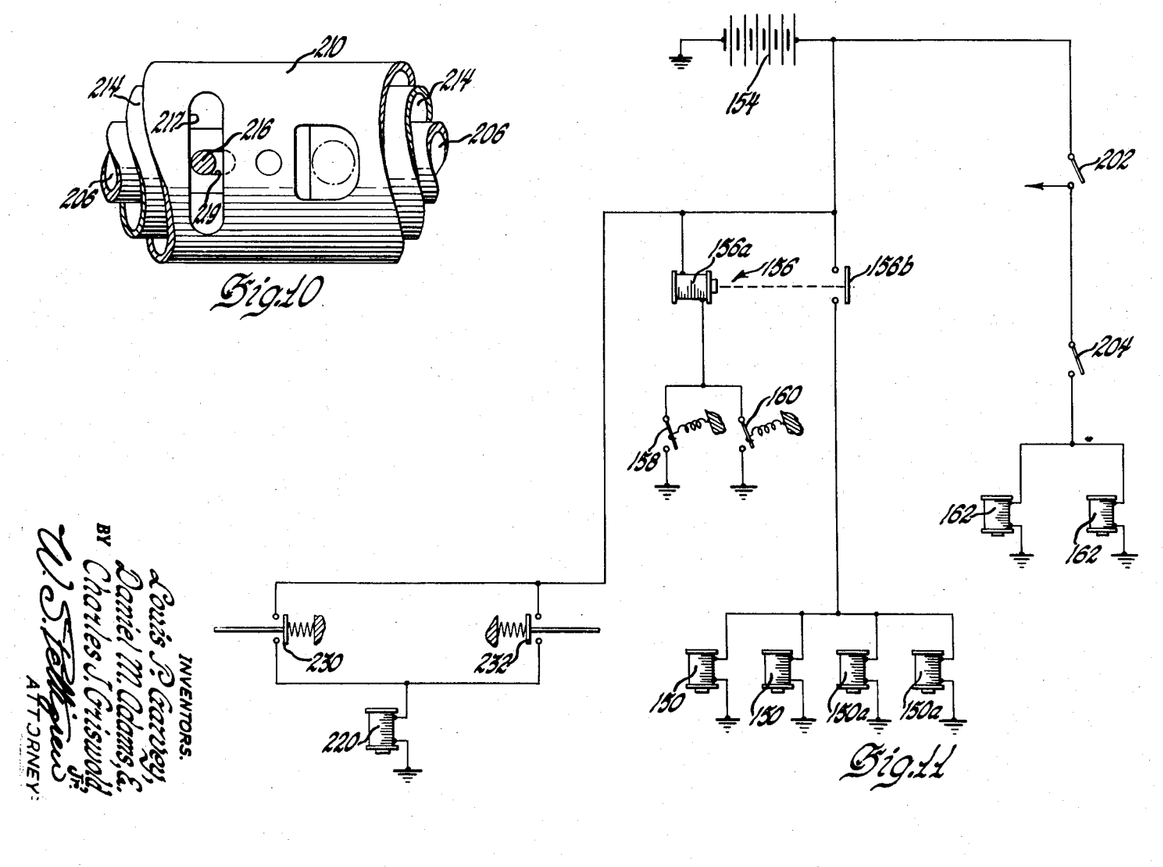
Figure 10 is a top plan view, partly in section, of part of the structure of Figure 9.
Figure 11 is a wiring diagram showing the electrical circuit of the latching system.

Figure 11 shows the electrical circuit for these solenoids. The automobile battery 154 has one terminal grounded in conventional manner and the other terminal connected through the coil 156a of a relay 156 to one terminal of parallel connected momentary contact single pole single throw switches 158 and 160. The other terminal of each of these switches is grounded. The switches preferably are located in the front compartment of the automobile so that they are readily accessible by the driver and by a front seat passenger. If desired, one of the switches can be mounted on each front door of the automobile, or the switches can be mounted on the dash panel or in some other convenient location. When either switch is closed, the relay coil 156a is energized, closing the normally open switch contact 156b of the relay to energize a circuit from the battery 154 through all of the solenoids 150, 150a, the solenoids being connected in parallel as shown in the wiring diagram. Consequently, momentary closure of switch 158 or switch 160 energizes all four of the locking solenoids so that all four doors are locked. The solenoids do not have a return spring and the overcenter spring 106 (Figure 5) which is connected to the lock lever 102, yieldably holds the parts in locked position after the momentary contact switch 158 or 160 is released and the relay switch 156b opens and the solenoids 150, 150a are deenergized. The doors may be unlocked by a garnish molding button, by operation of the inside handle, or by the key in the manner above described.

Figure 3:
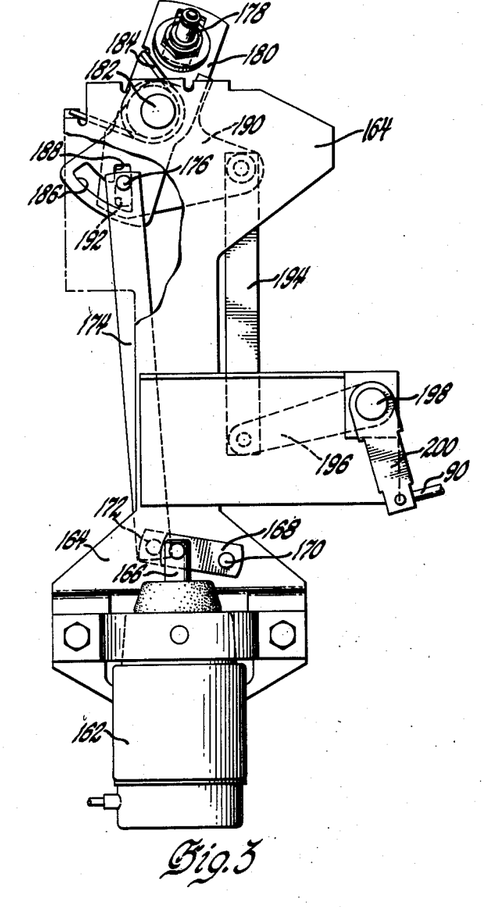
Figure 3 is an enlarged view of the rear door free wheeling mechanism shown in Figure 1.
Figure 4:
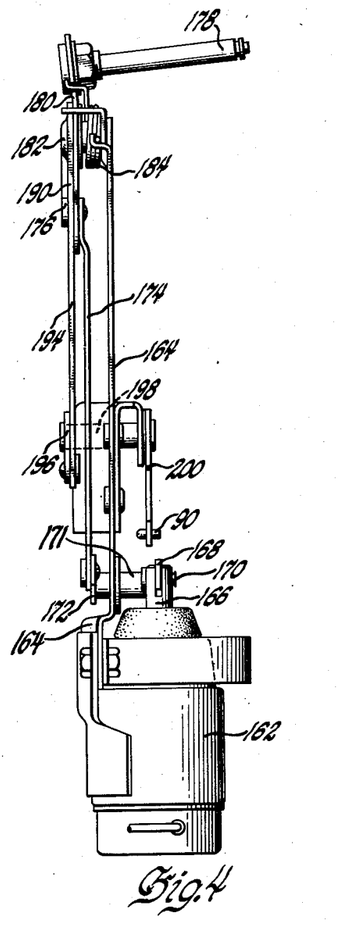
Figure 4 is a side view of the structure of Figure 3.

One of the features of this invention is to provide a safety device to prevent the rear door from being opened while the car is being driven. As mentioned above, this is particularly important since each rear door is hinged at its rear edge so that when it is opened it swings into the wind. Referring to Figures 1, 3 and 4, in each rear door there is a solenoid 162 carried on a frame 164 which is mounted in the door between the inner and outer panels thereof. The solenoid plunger 166 is connected by a crank link 168 to a shaft 170 which is rotatable in a bushing 171 extending through the frame 164. At the other end the shaft 170 carries a crank link 172, the free end of which is articulated to a link 174 extending upwardly in generally parallel relation to the frame 164. At its upper end the link mounts a headed stud 176.

The inside remote handle 32 is mounted on a shaft 178 which projects inside the door through a slot in the inner door panel and which is fixedly mounted inside the door on the upper end of a lever 180 which is pivoted intermediate its ends on a stud 182 projecting from the frame 164. A coil spring 184 on this stud biases the lever 180 in a clockwise direction as the parts are shown in Figures 1 and 3. Near its lower end the lever 180 is formed with an L-shaped slot having a generally horizontal curved stem portion 186 and a relatively short vertical leg portion 188. Pivoted coaxially with the lever 180 on the stud 182 is a bell crank 190 formed with a generally vertical elongated slot 192 which overlies the leg portion 188 of the L-shaped slot in the lever 180 and which extends down into alignment with the stem portion 186 of the slot in the lever 180. The stud 176 projects through the slots in both levers 180 and 190 and an internal spring in the solenoid 162 urges the solenoid plunger and the link 174 upwardly to the position illustrated in the drawings so that the stud 176 on the end of the link 174 lies in the leg portion 188 of the L-shaped slot in the lever 180. Consequently, the lever 180 and the bell crank 190 normally are tied together by the stud 176, and when the inside remote handle 32 is operated, the bell crank 190 is swung in a counterclockwise direction as the parts appear in Figures 1 and 3. This bell crank is connected to the remote rod 90 through a link 194 articulated at one end to a crank 196. This crank link projects from a shaft 198 which extends through the latch frame and at its other end carries a crank link 200 which is connected to the remote rod 90. When the parts are located as shown in Figure 3, operation of the remote handle 32 releases the detent 62 from the ratchet 60.

If the solenoid 162 is energized, its plunger 166 and the link 174 pull down so that the stud 176 is in alignment with the curved stem portion 186 of the L-shaped slot in the lever 180. Now the stud 176 no longer ties the lever 180 to the bell crank 190, and upon turning movement of the lever 180 when the handle 32 is operated, the stem portion 186 of the slot merely moves relative to the stud 176 and the bell crank 190 remains stationary.

Figure 11 shows the wiring diagram of the electrical circuit which controls this function. The battery 154 is connected through the automobile ignition switch 202 to one terminal of a switch 204. The other terminal of the switch 204 is connected to each of the solenoids 162 which are arranged in parallel with each other. Whenever the ignition switch 202 is closed and whenever the switch 204 is closed, the solenoids 162 are energized to disconnect each rear door handle from its associated latch so that the handle merely "free wheels" and the door cannot be opened from the inside.

Figures 8, 9:
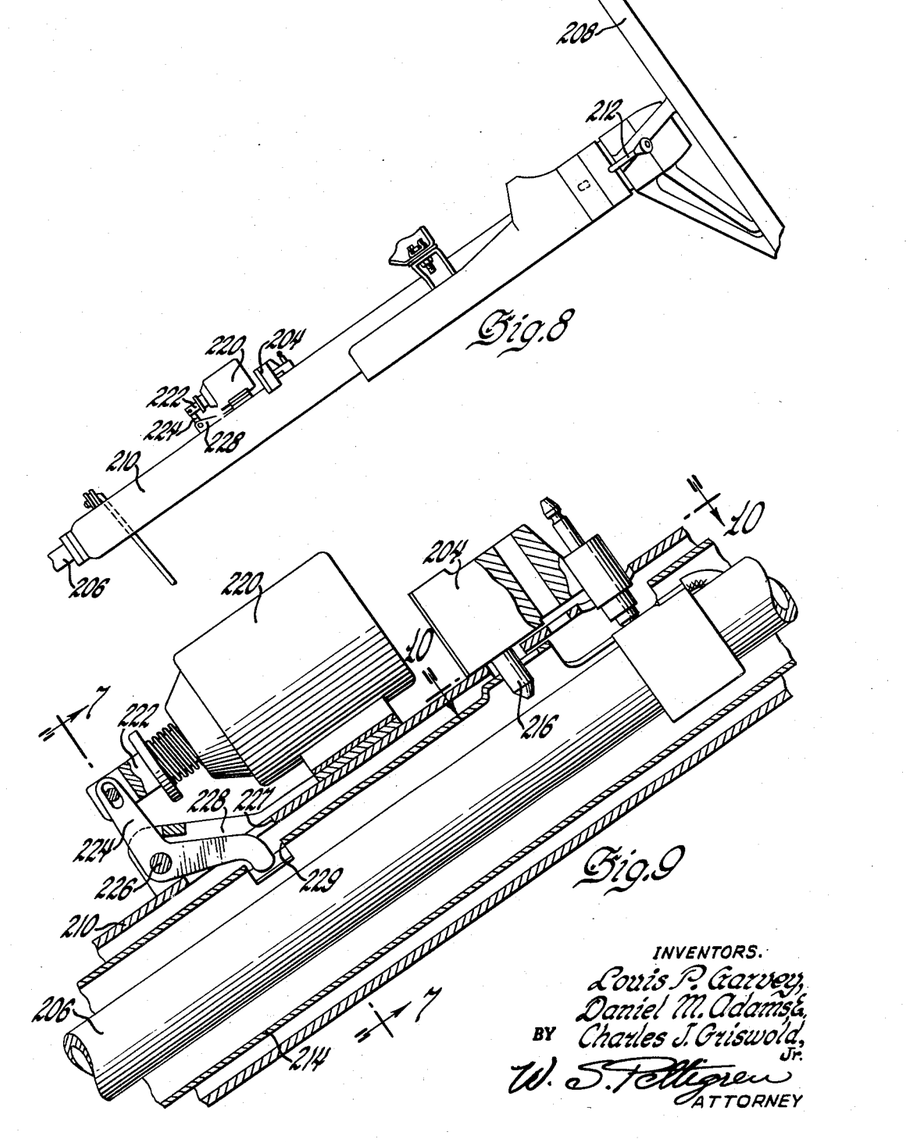
Figure 8 is a side elevation of the steering column of the automobile.
Figure 9 is an enlarged view, partly in longitudinal vertical section, of a portion of the structure of Figure 8.

The switch 204 is controlled by the position of the transmission selector lever in such a manner that when the transmission selector lever is in neutral or park the switch is open, but when the transmission selector is in any drive position the switch 204 is closed. Referring to Figures 8, 9 and 10, the automobile steering column is illustrated. The steering shaft 206, which is rotated by the steering wheel 208, is carried in a coaxial sheath 210, and a transmission selector lever 212 adjacent the steering wheel is coupled to the transmission control in conventional manner by means of a rotatable sleeve 214. The transmission control illustrated is for a well known type of automatic transmission, as for example a hydramatic transmission, and whenever the selector lever 212 is moved to a new position the sleeve 214 is rotated.

The switch 204 has an operating projection 216 which is swingable to open and close the switch. The projection 216 extends through a slot 217 in the sheath 210 and into an opening 219 in the rotatable sleeve 214 and is so arranged that the switch 204 is closed whenever the transmission selector is in any drive position, and the switch 204 is open whenever the transmission selector is in neutral or park positions.

With the arrangement described above, neither rear door can be opened from the inside if the ignition switch is on and if the transmission selector is in any drive position. Consequently, in order to open the rear door from the inside to permit a passenger to leave the rear compartment, it is necessary to move the transmission selector to neutral or park position or to turn off the ignition switch. It should be noted that in automatic transmissions of the conventional type, if the ignition switch is turned off it is necessary to move the transmission selector to neutral or park before the engine can again be started. Assuming then that the transmission selector has been moved to neutral or park while the engine is running so that switch 204 is open and the solenoids 162 are deenergized, the inside remote handle of each rear door is reconnected to its respective latch and either rear door can be opened from the inside. In order to prevent the vehicle operator from driving the car away before the rear door is closed, another safety feature is provided to block the transmission selector from being shifted to any drive position so long as either rear door is open.

Figure 7:
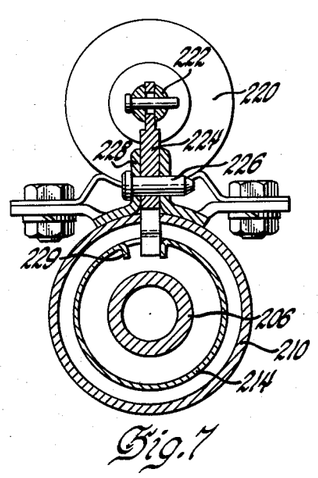
Figure 7 is a transverse section through the steering column of the automobile taken along the line 7—7 of Figure 9.

As seen in Figures 7, 8 and 9, a solenoid 220 is mounted on the steering column. The solenoid plunger 222 makes a pin and slot connection with one arm on a bell crank lever 224 which is pivoted at 226 on a guide yoke 228 mounted on the steering column. The other arm of the bell crank 224 extends between the guide members of this yoke and projects through an opening 227 in the sheath 210 into a slot 229 in the rotatable sleeve 214. This slot is so located that it is aligned with the projecting end of the bell crank arm when the transmission selector is in neutral, and as shown in Figures 7 and 9, the walls of the slot prevent rotation of the sleeve 214 so long as the bell crank is in the position illustrated so that the transmission cannot be shifted to any drive position.

In Figures 7 and 9 the solenoid is shown in its energized position. When deenergized the plunger 222 moves out of the solenoid body, swinging the bell crank so that its end moves out of the slot 229.

Referring to Figure 11, the wiring diagram for this safety arrangement includes the solenoid 220 connected to the battery 154 through parallel switches 230 and 232, one located in each rear door. One of these switches is illustrated in Figures 2, 5 and 6. The switches 230, 232 are biased toward a normally closed position by springs. One switch is associated with each rear door, and when the rear door is closed the switch is held open against the spring force. Consequently, when the door is closed the solenoid 220 is deenergized and its plunger is projected to the position other than that shown in Figures 7 and 9 so that the bell crank is out of blocking relation to the sleeve 214. However, when either or both doors are open, one or both of the switches 230, 232 is closed so that the solenoid 220 is energized and the bell crank 224 is held in the blocking position of Figures 7 and 9 so that the transmission selector cannot be moved to a drive position.

Referring particularly to Figures 2, 5 and 6, each rear door latch has the switch 230 mounted at the top of the latch frame and a switch plunger 234 projects from the switch housing. A switch actuating crank arm 236 projects from a rotatable shaft 238. This shaft extends through the flange portion 46 of the latch frame and carries an actuating crank finger 240 at its outer end above the bolt housing 48. When the door is open, this latch finger lies in the position shown in broken lines in Figure 2, being urged to this position by a spring 242. When the door is closed, the crank finger 240 engages the upper corner of the striker body, pivoting the cranks 236 and 240 in a counterclockwise direction as the parts appear in Figure 2 to permit the switch plunger 234 to move out under the force of an internal spring to open the switch. In this position the solenoid 220 is deenergized and the bell crank 224 is swung out of the slot 229 in sleeve 214 to permit the sleeve to rotate.

The switch 230 and its operating crank finger are so arranged that the switch will be closed should the door be in safety latched position. In other words, if the door is not fully closed as illustrated in Figure 2, but is only partially closed so that the bolt 52 engages the outer or safety tooth of the striker rather than engaging the inner or final latching tooth, the switch 230 will be in closed position and the bell crank 224 will block the transmission from being moved to a drive position.

While we have shown and described one embodiment of our invention, it is capable of many modifications. Changes, therefore, in the construction and arrangement may be made without departing from the spirit and scope of the invention as set forth in the appended claims.

We claim:
1. In combination in an automobile, transmission selector means movable between drive and neutral positions, said means including a sleeve mounted for rotational movement on its longitudinal axis; a door mounted for movement between open and closed positions; and means for blocking the transmission selector means from being moved out of a neutral position when the door is open, comprising a blocking lever adapted to enter a slot in said sleeve to block movement of the sleeve out of a neutral position, and electrical operating means for said blocking lever including door operated switch means and a solenoid connected to said switch means and to said blocking lever for moving the blocking lever into said slot when the door is open and when the transmission selector is in neutral position.

2. In combination in an automobile, transmission selector means movable between drive and neutral positions; an ignition switch; a door mounted for movement between open and closed positions; a door latch for holding the door closed; an operator for the latch, said operator being mounted on the door at a location spaced from the latch; means adapted to connect the operator to the latch; means operable in response to the position of said transmission selector means and ignition switch for disconnecting said operator from said latch when the transmission selector is in drive position and the ignition switch is closed; and means for blocking said transmission selector from being moved out of a neutral position when the door is open.

3. Apparatus of the character claimed in claim 2, wherein said last-mentioned means includes a solenoid, a blocking lever connected to said solenoid and adapted to block said transmission selector in a neutral position, and an operating circuit connected to said solenoid including door operated switch means for moving said blocking lever into blocking relation to the transmission selector means when the door is open.

4. In combination in an automobile, transmission selector means movable between drive and neutral positions; an ignition switch; a door mounted for movement between open and closed positions; a door latch for holding the door closed; a handle for operating the latch; a member connected to said handle; a member connected to said latch; coupling means releasably clutching said members together; means operable in response to the position of said transmission selector means and said ignition switch for moving said coupling means out of clutching engagement with said members when the transmission selector is in a predetermined position and the ignition switch is closed; and means for blocking said transmission selector means from being moved out of neutral position when the door is open, comprising a blocking lever adapted to engage in a slot to block the transmission selector means in a neutral position, and operating means including door operated switch means and a solenoid connected to said switch means and to said blocking lever for moving the blocking lever into said slot when the door is open and when the transmission selector is in neutral position.

5. In combination in an automobile, transmission selector means movable between drive and neutral positions; an ignition switch; a door mounted for movement between open and closed position; a door latch mounted on the door for holding the door closed, said latch including an operating lever; an operator for the latch, said operator being mounted on the door at a location spaced from the latch; connecting means extending from the location of said operator to said latch and connected to said operating lever; and clutch means operable in response to the position of said transmission selector means and ignition switch for connecting and disconnecting said operator from said connecting means.

6. Apparatus of the character claimed in claim 5, wherein the clutch means is arranged to disconnect the operator from the connecting means when the transmission selector is in drive position and the ignition switch is closed.

7. In combination in an automobile, transmission selector means movable between drive and neutral positions; an ignition switch movable between on and off positions; a door mounted for movement between open and closed positions; a door latch mounted on the door for holding the door closed, said latch including an operating lever; a handle for operating the latch, said handle being mounted on the door at a location spaced from the latch; a member connected to said handle; a member connected to the operating lever of said latch; coupling means located adjacent the handle for releasably clutching said members together; and means operable in response to the position of said transmission selector means and ignition switch for moving said coupling means out of clutching engagement with said members when the transmission selector is in a predetermined position.

8. Apparatus of the character claimed in claim 7, including means normally biasing the coupling means in a position to couple said members together.

References Cited in the file of this patent

UNITED STATES PATENTS

| | | |
|---|---|---|
| 1,664,042 | McGinley | Mar. 27, 1928 |
| 2,346,149 | Brewer | Apr. 11, 1944 |
| 2,626,003 | Kutzer | Jan. 20, 1953 |
| 2,716,568 | Davies | Aug. 30, 1955 |
| 2,717,169 | Lindbloom | Sept. 6, 1955 |
| 2,740,947 | Davies | Apr. 3, 1956 |